US011679046B2

(12) United States Patent
K. et al.

(10) Patent No.: US 11,679,046 B2
(45) Date of Patent: Jun. 20, 2023

(54) METHOD AND SYSTEM FOR PROVIDING DUAL AXES MOTIONS USING A SINGLE DRIVE

(71) Applicant: GE Precision Healthcare LLC, Wauwatosa, WI (US)

(72) Inventors: Rengarajan K., TamilNadu (IN); Rajender Singh, Bangalore (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 859 days.

(21) Appl. No.: 16/673,082

(22) Filed: Nov. 4, 2019

(65) Prior Publication Data

US 2021/0128381 A1 May 6, 2021

(51) Int. Cl.
| | | |
|---|---|---|
| *A61G 7/018* | (2006.01) | |
| *A61G 7/012* | (2006.01) | |
| *F16H 25/24* | (2006.01) | |
| *F16D 28/00* | (2006.01) | |
| *F16H 25/22* | (2006.01) | |
| *F16D 121/24* | (2012.01) | |

(52) U.S. Cl.
CPC ............. *A61G 7/018* (2013.01); *A61G 7/012* (2013.01); *F16D 28/00* (2013.01); *F16H 25/2204* (2013.01); *F16H 25/2454* (2013.01); *F16D 2121/24* (2013.01)

(58) Field of Classification Search
CPC .... A61G 7/012; A61G 7/018; F16H 25/2204; F16H 25/2454; F16D 28/00; F16D 2121/24
See application file for complete search history.

(56) References Cited

U.S. PATENT DOCUMENTS

| | | | |
|---|---|---|---|
| 4,812,725 A | | 3/1989 | Chitayat |
| 5,454,278 A | | 10/1995 | Kasuga |
| 6,955,468 B2 | | 10/2005 | Yabe et al. |
| 7,194,321 B2 | | 3/2007 | Sun et al. |
| 2003/0005785 A1 | | 1/2003 | Ung et al. |

FOREIGN PATENT DOCUMENTS

| | | | |
|---|---|---|---|
| CN | 1266395 C | | 7/2006 |
| CN | 110292394 A | * | 10/2019 |
| EP | 1107853 A1 | | 6/2001 |
| JP | H0649963 Y2 | | 1/1990 |
| JP | 5428290 B2 | | 2/2014 |

* cited by examiner

*Primary Examiner* — Randell J Krug
(74) *Attorney, Agent, or Firm* — McAndrews, Held & Malloy, Ltd.; Jacob Groethe; David Bates

(57) ABSTRACT

A system comprises a drive system comprising a single motor, a transmission configured to transmit power from the single motor to a first ball screw via a first clutch, and a second clutch configured to transmit power from the first ball screw to a second ball screw. The system also comprises a brake configured to apply a braking force to at least a portion of the drive system. The system further comprises a control module configured to control operation of one or more of the single motor, the first clutch, the second clutch, and the brake, where the control module is configured to move a scissors arms in a horizontal direction in a first configuration and adjust a vertical height of the scissors arms in a second configuration.

15 Claims, 8 Drawing Sheets

METHOD AND SYSTEM FOR PROVIDING DUAL AXES MOTIONS USING A SINGLE DRIVE

FIELD

Certain embodiments relate to moving an object in two dimensions. More specifically, certain embodiments relate to a method and system for providing dual axes motions using a single drive.

BACKGROUND

Medical imaging machines may sometimes be used for imaging at least a portion of a patient's body as part of diagnostic procedures. The imaging machines may be, for example, a computer axial tomography (CAT) scanner, a magnetic resonance imaging (MRI) scanner, positron emission tomography (PET) scanner, single photon emission tomography, etc., and hybrid imaging machines of above technologies. The patient may be placed on a bed on a table (gantry), and the table may be moved into position so that the imaging machine may make appropriate images of the patient. The table may also be raised to an appropriate height for the imaging machine to start imaging the patient and lowered after the imaging machine is finished imaging the patient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for providing dual axes motion using a single drive, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
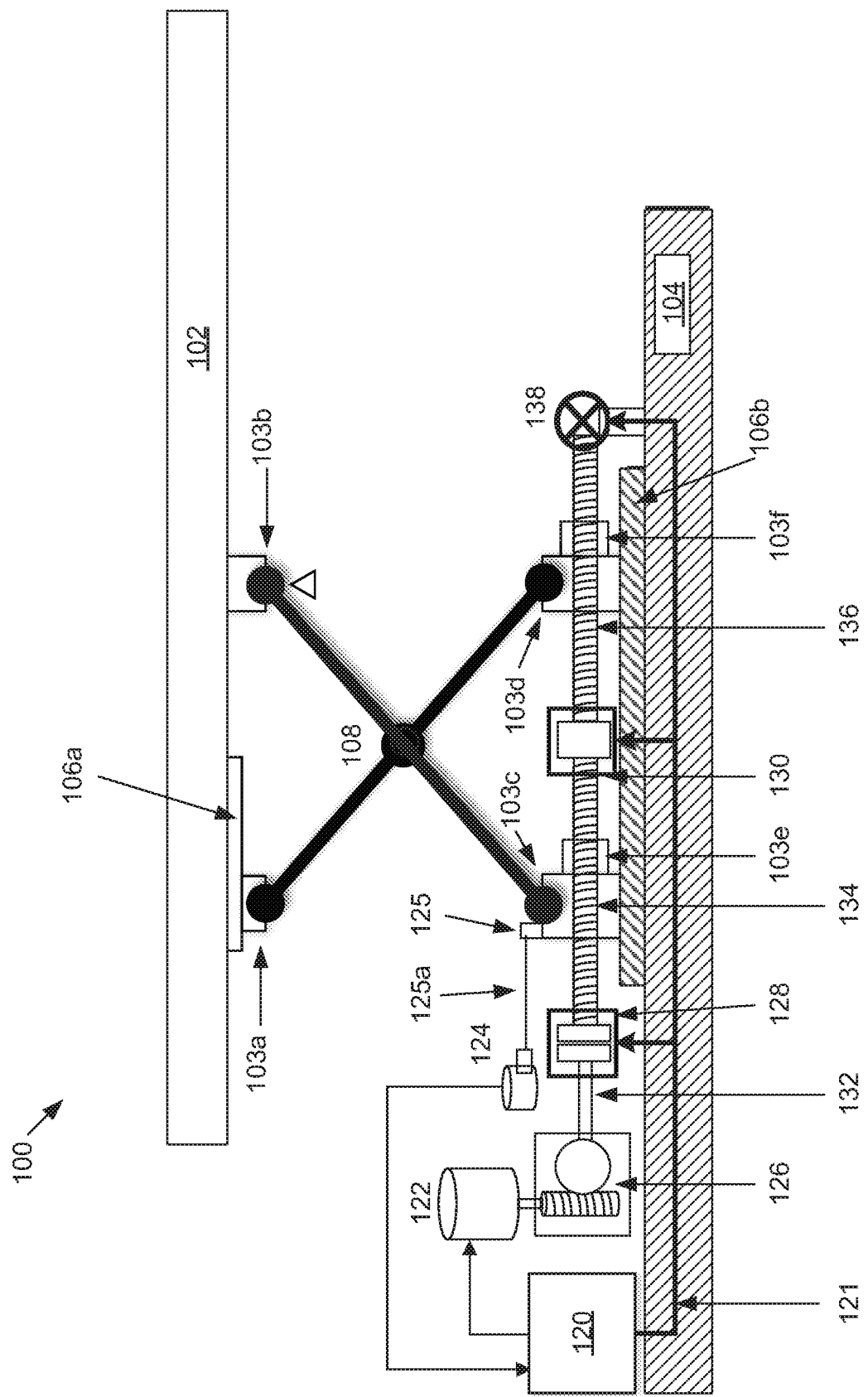
FIG. 1 is a diagram of an example dual axes moving system for moving a patient bed, in accordance with various embodiments.

Certain embodiments may be found in a method and system for facilitating movement of a patient bed in horizontal and vertical directions using a single drive.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between mechanical parts and/or hardware circuitry. The electrical and/or mechanical parts, such as a drive to provide power for moving the patient bed horizontally and/or vertically, may be, for example, an electric motor driving mechanical devices, a fluid pump driving mechanical devices, etc. The fluid pump may use hydraulic fluids or gas.

Additionally, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like.

It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "imaging machine" broadly refers to the CAT scanner, the MRI scanner, and any other medical imaging machines that is capable of scanning at least a part of a patient.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC or a combination thereof.

FIG. 1 is a block diagram of an patient bed positioning system that is operable to move a patient bed using a dual axes moving system, in accordance with various embodiments. Referring to FIG. 1, there is shown a patient bed positioning system 100 comprising a patient bed (or platform) 102, a table base 104, a control module 120, linear rails 106a and 106b, and scissors arms 108. The patient bed positioning system 100 may also comprise a motor 122, worm gear 126, a normally open clutch 128, a normally closed clutch 130, a drive shaft 132, ball screws 134, 136 and normally open brake 138.

The scissors arms 108 may have a first upper end rotatably coupled to the bed 102 at a rotatable coupling with linear bearing 103a on the linear rail 106a and a second upper end rotatably coupled to a fixed coupling point 103b of the bed 102. The scissors arms 108 may also have a first lower end rotatably coupled to the linear rail 106b at a rotatable coupling with linear bearing 103c and a second lower end rotatably coupled to the linear rail 106b at a rotatable coupling with linear bearing 103d. The rotatable couplings with linear bearings 103c and 103d have respective ball nuts 103e and 103f. As the scissors arms 108 scissors in or out, the rotatable couplings with linear bearings 103a, 103c, and/or 103d may slide along the respective linear rails 106a and 106b. Accordingly, the patient bed 102 may move horizontally or vertically. This is explained in more detail with respect to FIGS. 2 and 3.

While an embodiment of the disclosure describes the scissors arms 108 as coupling to the rotatable coupling with linear bearings 103a, 103c, and 103d, various embodiments of the disclosure may use one or more other rotatable couplings that allow linear motion.

The power for moving the patient bed 102 is provided by the motor 122, and the power is transmitted via the worm gear 126 and the drive shaft 132 to the ball screws 134 and 136. For the purposes of this disclosure, the worm gear 126 and the drive shaft 132 may be referred to as a transmission.

The normally open clutch 128 is used to transmit power to the ball screw 134, and the normally closed clutch 130 is used to transmit power to the ball screw 136. The normally open clutch 128 in its normal state does not transmit power from the drive shaft 132 to the ball screw 134. It needs to be activated to close (engage) so that it can transmit power from the drive shaft 132 to the ball screw 134. The normally closed clutch 130 in its normal state is configured to transmit power from the ball screw 134 to the ball screw 136. It needs to be inactivated to open (disengage) so that it does not transmit power from the ball screw 134 to the ball screw 136.

It should be noted that an embodiment of the disclosure has power transmitted from the motor 122 to the worm gear 126 to the normally open clutch 128 that is activated to transmit power to the ball screw 134 to the normally closed clutch 130 to the ball screw 136.

When the normally open clutch 128 is closed, the ball screw 134 will turn depending on the rotation of the motor 122. Accordingly, this will force the rotatable coupling with linear bearing 103c to move horizontally on the linear rail 106b.

When the normally closed clutch 130 is closed, the ball screw 136 will turn in the direction that the ball screw 134 is turning. This will force the rotatable coupling with linear bearing 103d to move horizontally on the linear rail 106b.

The normally open brake 138 in a normal position does not apply a braking force on the ball screw 136 to keep it from turning. Accordingly, the normally open brake 138 needs to be activated to a closed position to apply a braking force to keep the ball screw 136 in a fixed position to provide stability to the patient bed positioning system 100 as desired.

The brake 138 may be, for example, an electromagnetic brake or a mechanical brake in use at the time of the disclosure, as well as any other type of brake that will be disclosed in the future.

The control module 120 may be configured to control the motor 122 to turn the ball screws 134 and 136. The control module 120 may use position feedback from, for example, a sensor 124. The sensor 124 may be, for example, a position encoder 124, where a wire 125a may be coupled to an anchor 125. In some embodiments, the position encoder 124 may be, for example, an absolute encoder. By determining the length of wire that has been played out or reeled in, the position encoder 124 may provide information to the control module 120 regarding a position of the rotatable coupling with linear bearing 103c. The feedback may also be provided by other sensors, for example, that allow measurement of distance.

The control module 120 may also be configured to control the normally open clutch 128, the normally closed clutch 130, and the normally open brake 138 via commands sent on the wired line 121.

In various embodiments of the disclosure, the communication from the control module 120 to and from any of the motor 122, the position encoder 124, the clutches 128, 130, and the brake 138 may also be performed wirelessly using any one of various wireless technologies such as, for example, Bluetooth communication, WiFi, ZigBee, a proprietary protocol, etc. The control module 120 may comprise one or more processors, memory, and code executable by the one or more processors to perform various functions. The control module 120 may also comprise hardware circuitry such as glue logic, state machines, logic circuitry, etc.

As the various devices described for the patient bed positioning system 100 are well-known to one of ordinary skill in the art, these devices will not be described in further detail. However, this does not preclude use of devices that will be developed in the future that can be used to perform similar functionalities as described in the present disclosure.

Figure 2:
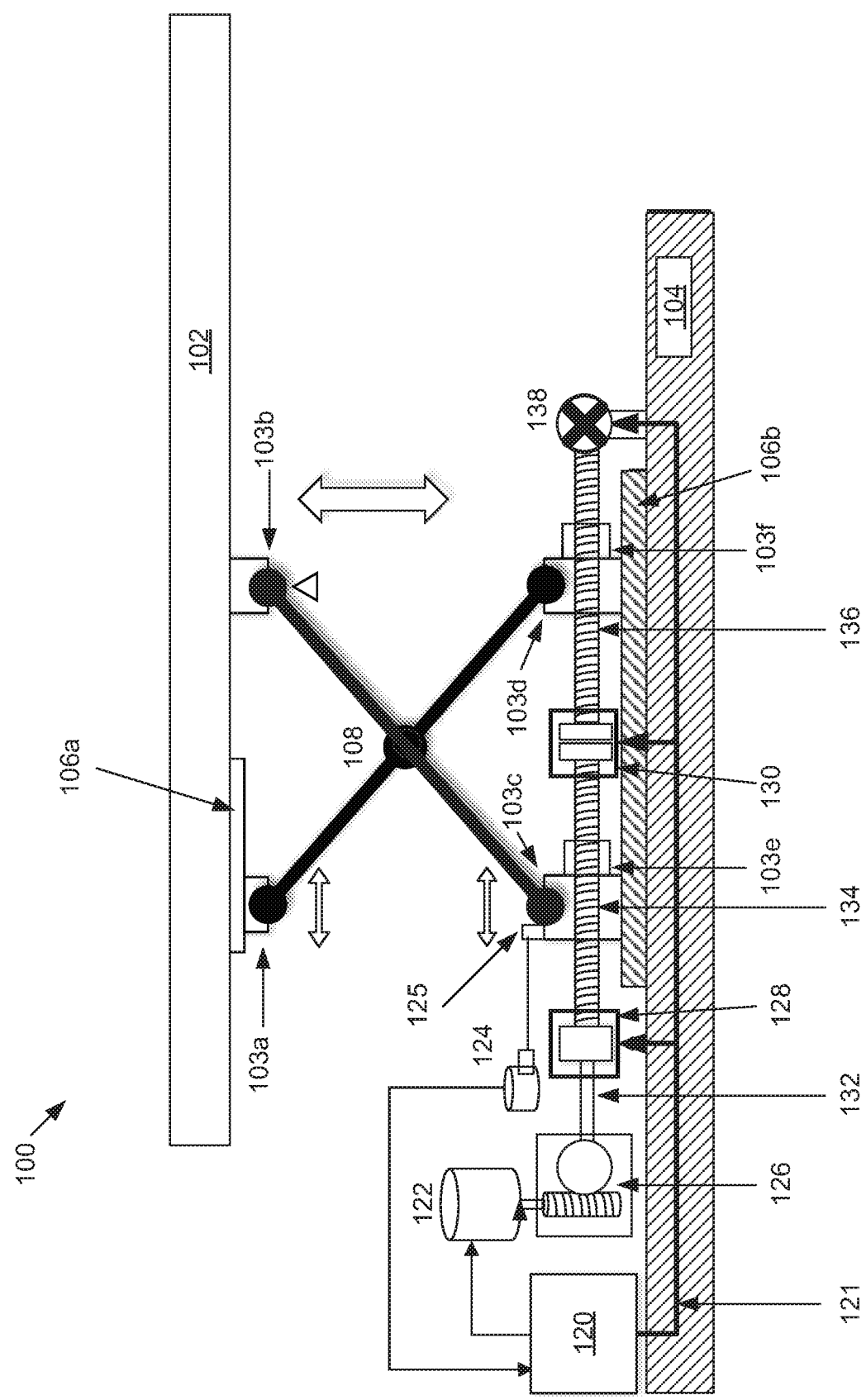
FIG. 2 is a diagram of the example system of FIG. 1 for moving the patient bed in a vertical direction, in accordance with various embodiments.

FIG. 2 is a diagram of the example system of FIG. 1 for moving the patient bed in a vertical direction, in accordance with various embodiments. Referring to FIG. 2, there is shown the patient bed positioning system 100 of FIG. 1 configured to move the bed 102 in a vertical direction. The control module 120 may control the normally open brake 138 to close so as to provide braking force to the ball screw 136 to keep it from turning. The control module 120 may control the normally closed clutch 128 to open so that the ball screw 136 does not receive any power generated by the motor 122. The control module 120 may control the normally open clutch 128 to close to allow power to be transmitted from the motor 122 to the ball screw 134.

Accordingly, the upper right end of the scissors arms 108 cannot move since it is fixedly coupled to the fixed coupling point 103b and the lower right end of the scissors arms 108 cannot move since the ball screw 136 has a braking force applied to it by the normally open brake 138. Therefore, when the ball screw 134 turns, the lower left end of the scissors arms 108 is forced to move horizontally. As the upper right end and the lower left end of the scissors arms 108 cannot move, the scissors arms 108 move to raise or lower the patient bed 102.

Figure 3:
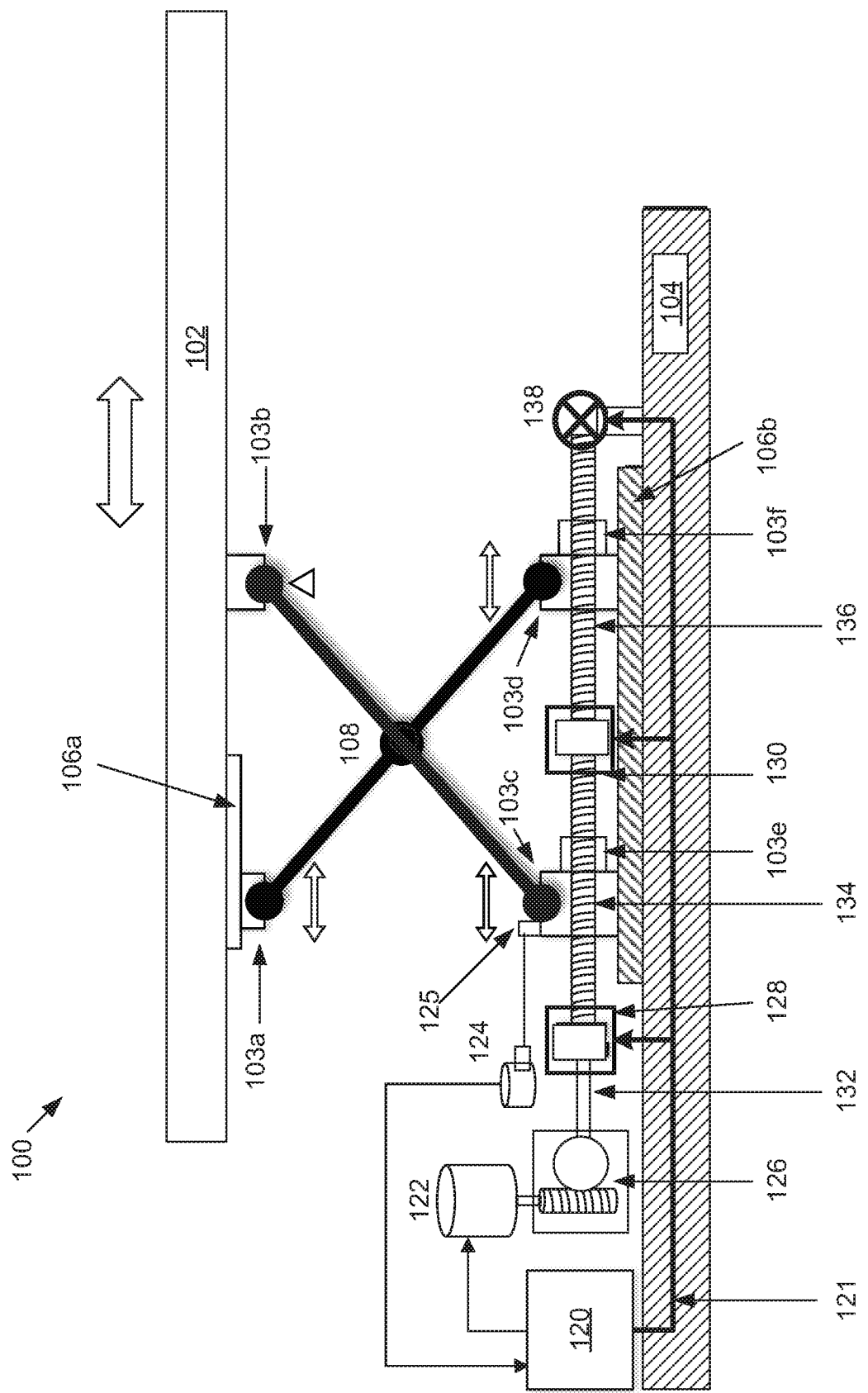
FIG. 3 is a diagram of the example system of FIG. 1 for moving the patient bed in a horizontal direction, in accordance with various embodiments.

FIG. 3 is a diagram of the example system of FIG. 1 for moving the patient bed in a horizontal direction, in accordance with various embodiments. Referring to FIG. 3, there is shown the patient bed positioning system 100 of FIG. 1 configured to move the bed 102 in a horizontal direction. The control module 120 may control the normally open brake 138 to open to allow the ball screw 136 to turn. The control module 120 may control the normally closed clutch 130 to remain closed so that the ball screw 136 turns with the ball screw 134. The control module 120 may control the normally open clutch 128 to close to allow power to be transmitted from the motor 122 to the ball screw 134.

Accordingly, since the lower right end of the scissors arms 108 moves along with the lower left end of the scissors arms 108, the scissors arms 108 remains in the shape it was in (does not scissors to open further or close further). Rather, the scissors arms 108 as a whole is forced to move horizontally on the linear rails 106b. Therefore, the patient bed 102 will also move horizontally with the scissors arms 108.

Figure 4:
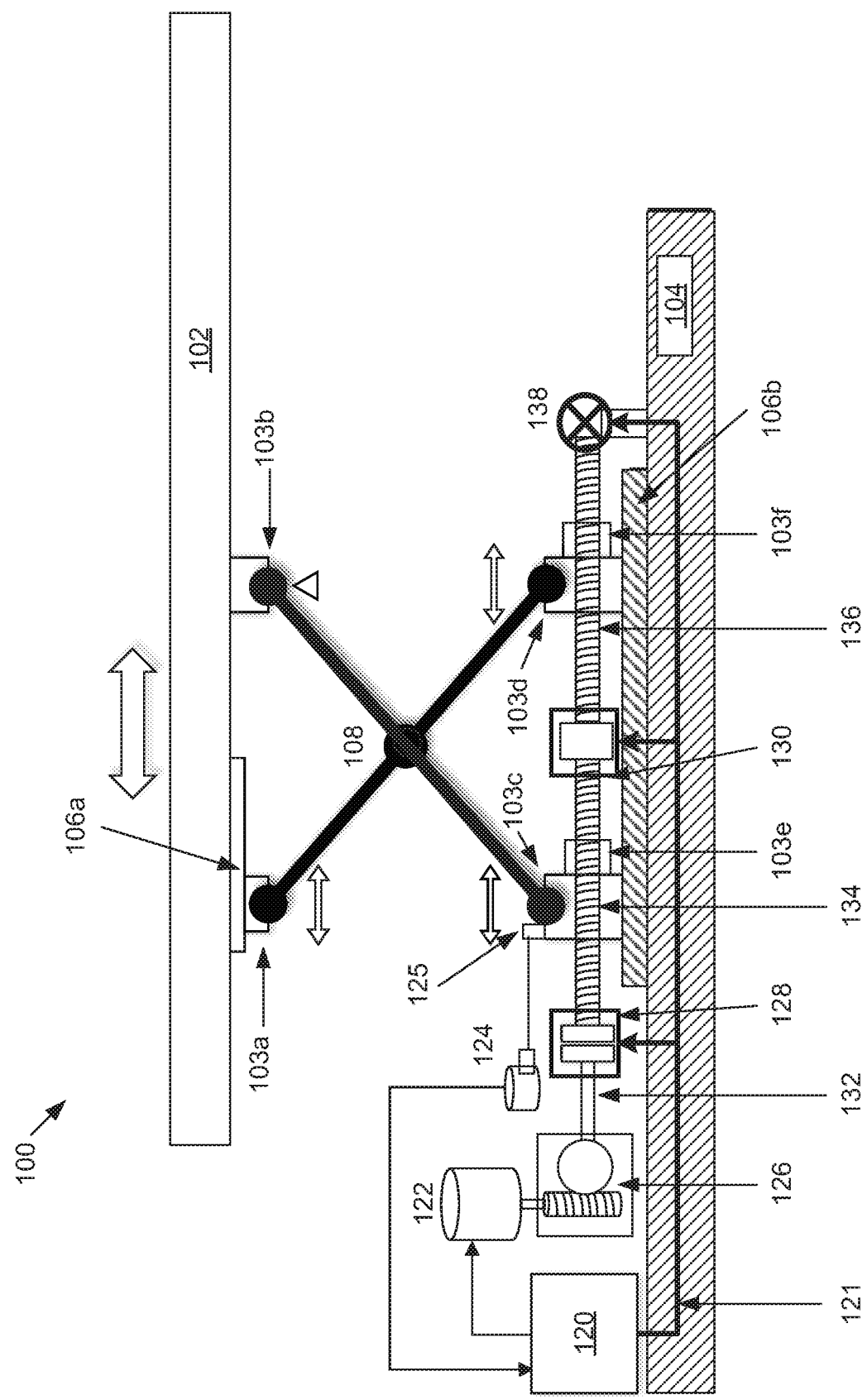
FIG. 4 is a diagram of the example system of FIG. 1 for moving the patient bed in a standby mode, in accordance with various embodiments.

FIG. 4 is a diagram of the example system of FIG. 1 for putting the patient bed in a standby mode, in accordance with various embodiments. Referring to FIG. 4, the patient bed positioning system 100 of FIG. 1 is in a standby, or default, configuration. This may be, for example, when power is lost to the patient bed positioning system 100. Therefore, the normally open clutch 128 is in the open position isolating the ball screw 134 from the motor 122. The normally closed clutch 130 is in the closed position to allow the ball screw 136 to rotate with the ball screw 134. The normally open brake 138 is in the open position to allow the ball screw 136 to turn if there is a force acting to turn the ball screw 136.

Accordingly, the ball screws 134 and 136 can rotate without strong resistance since the ball screw 134 is not coupled to the motor 122 and the ball screw 136 does not have a braking force applied to it. Therefore, if a patient is on the bed 102, and the bed 102 was positioned in an imaging machine when power was lost, an operator can pull the bed 102 out of the imaging machine.

Figure 5A:
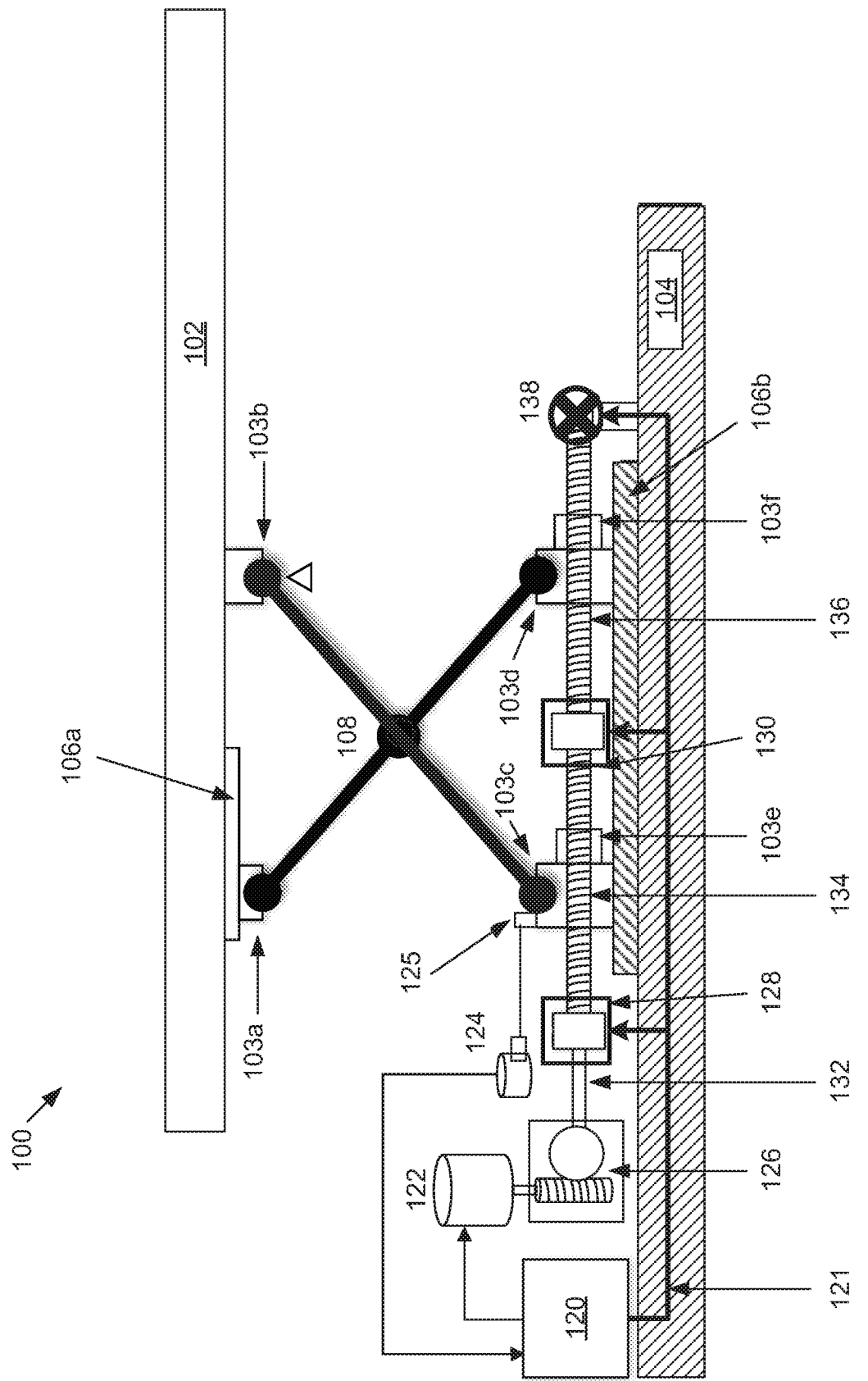
FIG. 5A is a diagram of the example system of FIG. 1 for keeping the patient bed in a locked position, in accordance with various embodiments.

FIG. 5A is a diagram of the example system of FIG. 1 for keeping the patient bed in a locked position, in accordance with various embodiments. The patient bed positioning system 100 may also be configured to keep it from moving due to external perturbations. In this case, the clutches 128 and 130 can be set to a closed position to couple the motor 122 to the ball screws 134 and 136, and the brake 138 can be configured to apply braking force to the ball screw 136.

Figure 5B:
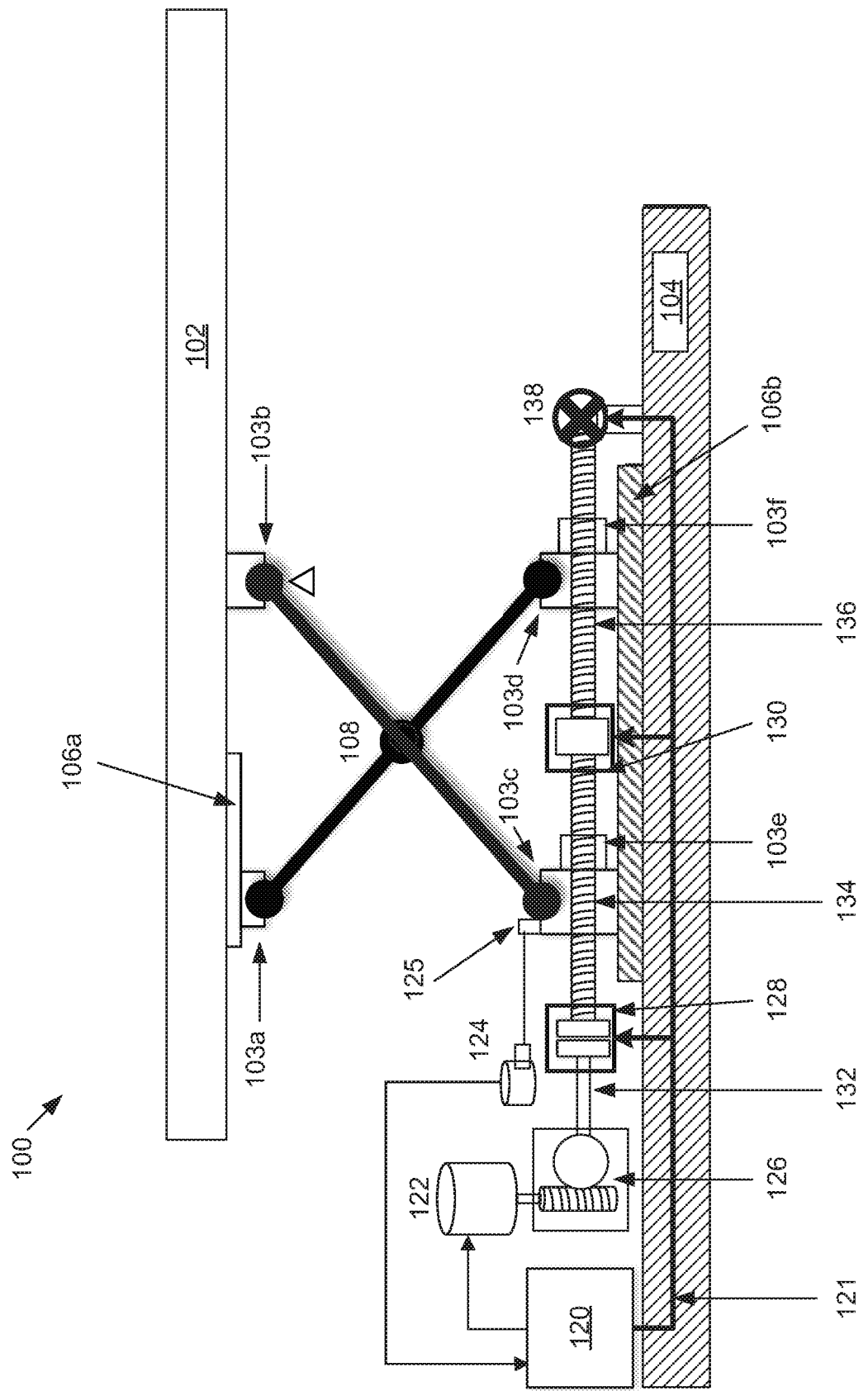
FIG. 5B is a diagram of the example system of FIG. 1 for another method of keeping the patient bed in a locked position, in accordance with various embodiments.

FIG. 5B is a diagram of the example system of FIG. 1 for another method of keeping the patient bed in a locked position, in accordance with various embodiments. The patient bed positioning system 100 may also be configured in another way to keep it from moving due to external perturbations. In this case, the normally open clutch 128 is left open and the normally closed clutch 130 is left closed to couple the ball screws 134 and 136, and the brake 138 can be configured to apply braking force to the ball screw 136.

Figure 6:
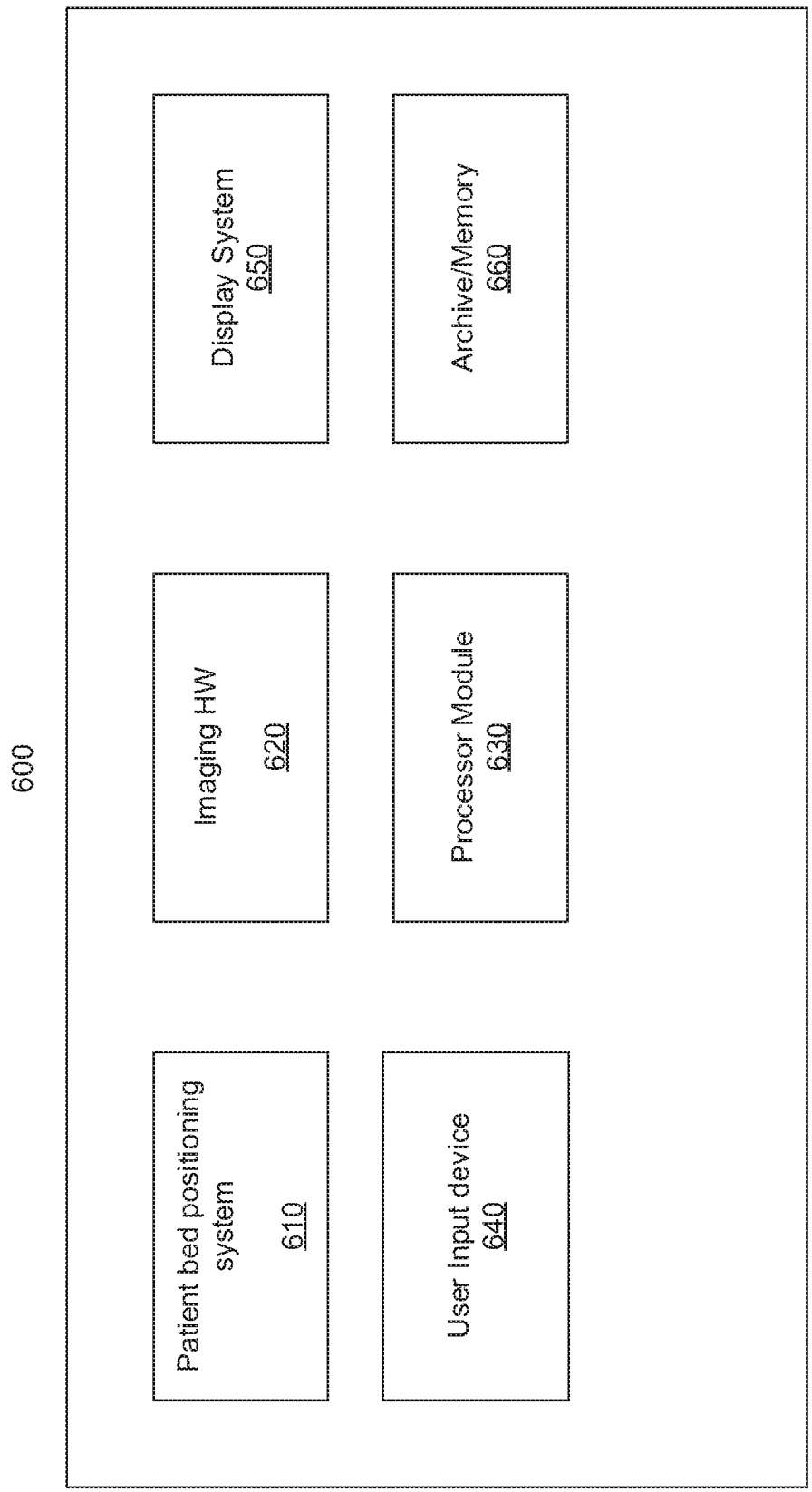
FIG. 6 is a block diagram of an imaging system that includes the system for moving a patient bed, in accordance with various embodiments.

FIG. 6 is a block diagram of an imaging system that includes the system for moving a patient bed, in accordance with various embodiments. Referring to FIG. 6, there is shown an imaging system 600 comprising a patient bed positioning system 610 that may be similar to the patient bed positioning system 100, imaging hardware 620, a processor module 630, user input device 640, display system 650, and archive/memory 660.

As described above with respect to the patient bed positioning system 100, the patient bed positioning system 610 may be moved in vertical and/or horizontal directions to move the patient bed to the imaging hardware 620 so that the imaging hardware 620 can take images of the patient. The imaging hardware 620 may be, for example, a CAT scanner, an MRI scanner, a PET scanner, etc., where a bed on which a patient lies may need to be moved to a position conducive for image scanning.

The movement of the patient bed positioning system 610 may be controlled by, for example, the processor module 630. In that respect, the processor module 630 may be similar to the control module 120 described above. The processor module 630 may comprise one or more processors, central processing units, microprocessors, microcontrollers, and/or the like. The processor module 630 may be an integrated component, or may be distributed across various locations, for example. In an exemplary embodiment, the processor module 630 may be capable of receiving input information from a user input device 640 and/or archive/memory 660, generating an output displayable by a display system 650, and manipulating the output in response to input information from a user input device 640, among other things. The processor module 630 may be capable of executing any of the method(s) and/or set(s) of instructions discussed herein in accordance with the various embodiments, for example.

Accordingly, the processor module 630 may comprise suitable logic, circuitry, interfaces, and/or code that may be operable to process image data for generating images for presentation on a display system 650. Various embodiments of the disclosure may allow the processor module 630 to comprise volatile and/or non-volatile memory.

The processor module 630 is operable to perform one or more processing operations according to a plurality of selectable imaging modalities on the acquired image scan data. In an exemplary embodiment, the processor module 630 may be operable to perform display processing and/or control processing, among other things.

Acquired image scan data may be processed in real-time during an image scanning session as the image scan data are received and/or the image scan data may be stored in the archive/memory 660 to be processed at a later time. In various embodiments, the processed image data can be presented at the display system 650 and/or may be stored at the archive/memory 660. The archive/memory 138 may comprise a local archive, a Picture Archiving and Communication System (PACS), or any suitable device for storing images and related information.

The archive/memory 660 may be one or more computer-readable memories integrated with the imaging system 100 and/or communicatively coupled (e.g., over a network) to the imaging system 100, such as a Picture Archiving and Communication System (PACS), a server, a hard disk, floppy disk, CD, CD-ROM, DVD, compact storage, flash memory, random access memory, read-only memory, electrically erasable and programmable read-only memory and/or any suitable memory. The archive/memory 660 may include databases, libraries, sets of information, or other storage accessed by and/or incorporated with the processor module 630, for example. The archive/memory 660 may be able to store data temporarily or permanently, for example. The archive/memory 660 may be capable of storing medical image data, data generated by the processor module 630, and/or instructions readable by the processor module 630, among other things. In various embodiments, the archive/memory 660 stores, for example, image data, labeled images, identification instructions, segmentation instructions, labeling instructions, and tracking instructions, etc. The archive/memory 660 may also comprise, for example, volatile memory such as dynamic random access memory (DRAM) and/or static random access memory (SRAM).

The user input device 640 may be utilized to input patient data, scan parameters, settings, select protocols and/or templates, and the like. In an exemplary embodiment, the user input device 640 may be operable to configure, manage, and/or control operation of one or more components and/or modules in the imaging system 100. In this regard, the user input device 640 may be operable to configure, manage, and/or control operation of the patient bed positioning system 610, the imaging hardware 620, the processor module 630, the user input device 640, the display system 650, and/or the archive/memory 660.

The user input device 640 may include, for example, button(s), rotary encoder(s), a touchscreen, motion tracking, voice recognition, a mouse device, keyboard, camera, and/or any other device capable of receiving a user directive. In certain embodiments, one or more of the user input devices 640 may be integrated into other components, such as the display system 650, for example. As an example, the user input device 640 may include a touchscreen display. As another example, the user input device 640 may include an accelerometer, gyroscope, and/or magnetometer attached to and/or integrated with the patient bed positioning system 610 to provide, for example, location information and/or movement information.

The display system 650 may be any device capable of communicating visual information to a user. For example, a display system 650 may include a liquid crystal display, a light emitting diode display, and/or any suitable display or displays. The display system 650 can be operable to present images and/or any suitable information. For example, the images presented at the display system 650 may include labels, tracking identifiers, and or any suitable information.

Components of the imaging system 600 may be implemented using various technologies in mechanical systems as described above for the patient bed positioning system 100, hardware, software, firmware, and/or the like. The various components of the imaging system 100 may be communicatively linked. Components of the imaging system 100 may be implemented separately and/or integrated in various forms. For example, the display system 650 and the user input device 640 may be integrated as a touchscreen display.

Figure 7:
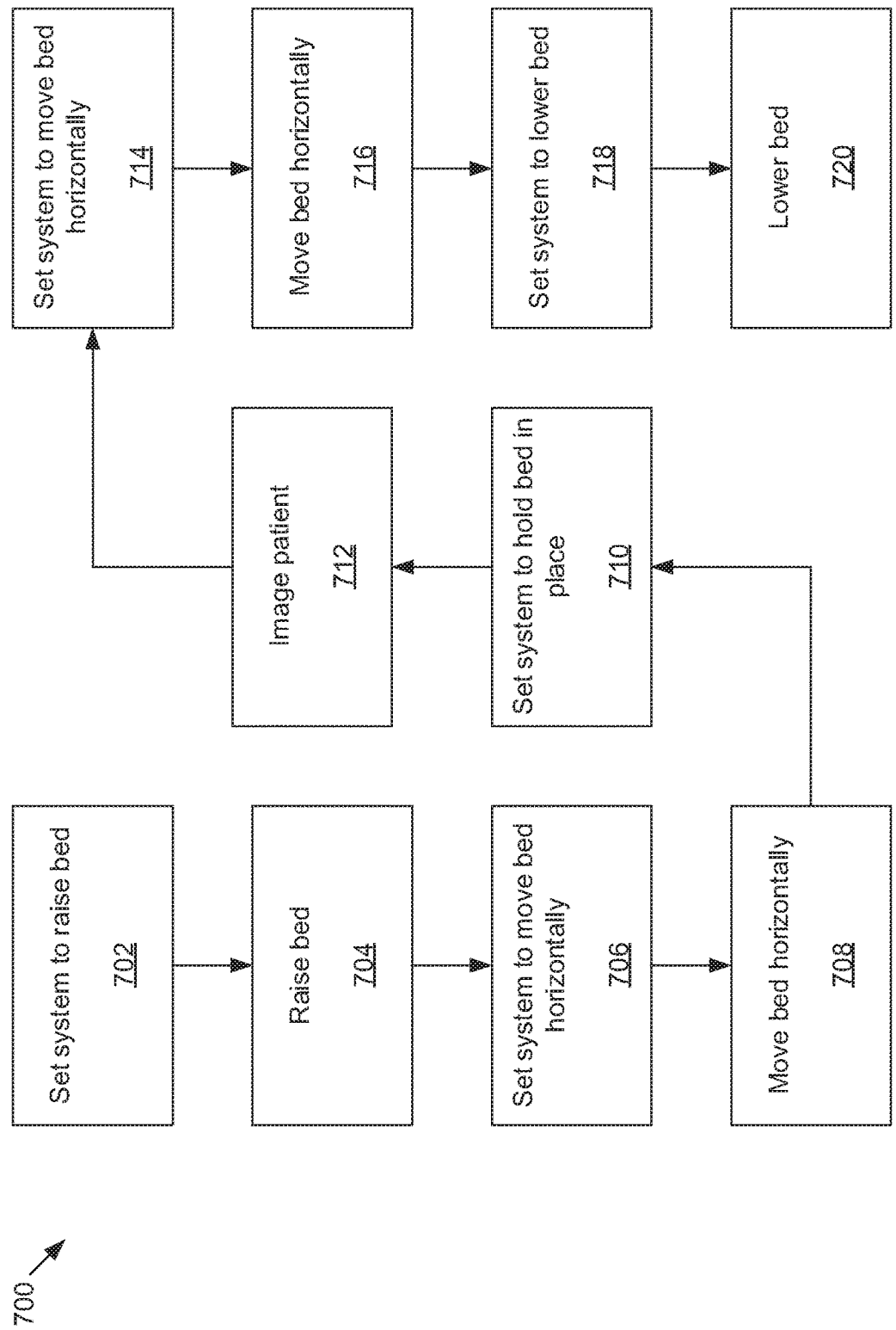
FIG. 7 is a flow chart for using the example system of FIG. 1 for taking images of a patient, in accordance with various embodiments.

FIG. 7 is a flow chart for using the example system of FIG. 1 for taking images of a patient, in accordance with various embodiments. Referring to FIG. 7, there is shown the flow diagram 700 with blocks 702 to 720. In block 702, the patient gets on the bed 102 and the patient bed positioning system 100 is configured to raise the bed 102. The patient bed positioning system 100 is configured as described above with respect to FIG. 2. In block 704, the bed 102 may be raised by the turning the motor 122 until the bed 102 reaches a pre-determined desired height. The height may be stored in, for example, in memory associated with the processor module 630 and/or the archive/memory 660. Alternatively, the height may be entered by an operator via the user input device 640.

In block 706 the patient bed positioning system 100 is configured to move the bed 102 horizontally into position to allow the patient to be scanned by the imaging hardware 620. The configuration may be set as described above with respect to FIG. 3. In block 708, the bed 102 may be moved horizontally by the turning the motor 122. The motor 122 is turned on to move the bed 102 an appropriate distance based on feedback from the position encoder 124. The appropriate distance may be determined based on, for example, the distance stored in memory associated with the processor module 630 and/or the archive/memory 660. Alternatively, the distance may be entered by an operator via the user input device 640.

In block 710, the bed 102 may be secured in place by configuring the patient bed positioning system 100 as described with respect to FIG. 5A or FIG. 5B. In block 712, the processor module 630 may control the imaging hardware 620 to get desired images of the patient. After the imaging is finished, the bed 102 may be restored to its original position to allow the patient to get off the bed.

Accordingly, in block 714, the patient bed positioning system 100 may be configured to move the bed horizontally. If block 710 was not performed to secure the bed, then block 714 may not be performed since the patient bed positioning system 100 is still in the configuration to move the bed 102 horizontally. In block 716, the motor 122 may be turned on appropriately to move the bed 102 to a position where the bed 102 can be lowered.

In block 718, the patient bed positioning system 100 is configured to lower the bed 102, and in block 720, the motor 122 is turned on to lower the bed 102.

Various embodiments of the disclosure may configure the patient bed positioning system 100 automatically as needed at the various blocks. Various embodiments of the disclosure may provide an override by an operator to further raise/lower the bed 102 and/or move the bed 102 horizontally. The operator's input may be via, for example, the user input device 640.

Accordingly, while the dual axes moving system is described for moving a patient bed in a medical scanning system, the dual axes moving system can be used for any another purpose where an object needs to be moved along two axes. The dual axes moving system may also be used, for example, as a part of a system that requires motion along three axes.

As shown in the FIGS. 1-5B, the scissors arms 108 shows a side view from one side of the patient bed positioning system 100. Some embodiments may use other structures to keep the patient bed positioning system 100 stable. For example, there may be a cross-bar on the linear rails 106a and/or 106b to provide lateral stability to the patient bed positioning system 100.

Some embodiments may have, for example, two scissors arms 108 in parallel with each other when the load to be moved is heavy. In some embodiments, the bottom left ends of the parallel scissors arms 108 may be coupled together and the bottom right ends of the parallel scissors arms 108 may be coupled together. Accordingly, there is still only needed two ball screws 134 and 136, two clutches 128 and 130, a single brake 138, a single motor 122, a single worm gear 126, a single drive shaft 132, etc.

In some embodiments, a second of the two scissors arms 108 may not be coupled to the drive system but is merely present to lend stability to the patient bed positioning system 100. Generally, a drive system may refer to a power source (e.g., motor 122) and the parts transmitting power from the power source (the worm gear 126, the drive shaft 132, the ball screws 134 and 136) to the scissors arms 108.

However, various embodiments of the disclosure may have a completely parallel sets of parts. Some embodiments may slant two scissors arms 108 towards each other at the top or at the bottom. As can be seen, there are many variations for using a single drive to allow dual axes motions. Using a single drive (motor) can save money since parts for a second drive system are not needed. Generally, a drive system may refer to a power source (e.g., motor 122) and the parts transmitting power from the power source (the worm gear 126, the drive shaft 132, the ball screws 134 and 136, and the clutches 128 and 130) to the scissors arms 108.

Additionally, while a feedback system is described for some embodiments, other embodiments of the disclosure may use open loop control of the motor 122. Accordingly, the sensor 124, the anchor 125, and the wire 125a may not be needed.

Accordingly, it can be seen that the disclosure provides for a system comprising a drive system that comprises a single motor, a transmission configured to transmit power from the single motor to a first ball screw via a first clutch, and a second clutch configured to transmit power from the first ball screw to a second ball screw. The system also comprises a brake configured to apply a braking force to at least a portion of the drive system. The braking force is applied to the second clutch. The system may also comprise a control module configured to control operation of one or more of the single motor, the first clutch, the second clutch, and the brake, wherein the control module is configured to move a scissors arms in a horizontal direction in a first configuration and adjust a vertical height of the scissors arms in a second configuration. The first clutch may be, for example, a normally open clutch and the second clutch may be a normally closed clutch.

In the first configuration, the first clutch is configured to engage the transmission to the first ball screw, the second clutch is configured to engage the first ball screw to the second ball screw, and the brake is configured to not apply a brake force to the at least a portion of the transmission.

In the second configuration, the first clutch is configured to engage the transmission to the first ball screw, the second clutch is configured to not engage the first ball screw to the second ball screw, and the brake is configured to apply a brake force to at least a portion of the transmission such as, for example, the second ball screw. The brake may be, for example, an electromagnetic brake.

The scissors arms comprise a first and a second top ends and a first and a second bottom ends. The first bottom end may be rotatably coupled to a first linear bearing and the second bottom end may be rotatably coupled to a second linear bearing. The first and second linear bearings may be coupled to a linear rail. The system may comprise a sensor configured to provide feedback information regarding a position of a portion of the scissors arms.

The disclosure may also provide for a method for adjusting a position of a device along two axes, comprising configuring, by a control module, a drive system to a first configuration, providing power, by a single motor, in the first configuration of the drive system to move a load on the device along a horizontal axis, configuring, by the control module, the drive system to a second configuration, and providing power, by the single motor, in the second configuration of the drive system to move the load on the device along a vertical axis.

The first configuration may comprise configuring the drive system for a first ball screw to receive power from the single motor, configuring the drive system for a second ball screw to receive power from the first ball screw, and controlling a brake to not apply brake force to the second ball screw.

The second configuration comprises configuring the drive system for a first ball screw to receive power from the single motor, configuring the drive system for a second ball screw to not receive power from the first ball screw, and controlling a brake to apply brake force to the second ball screw. The brake may be an electromagnetic brake. The method may further comprise using position feedback of the device for controlling moving the load on the device along the horizontal axis.

The disclosure may further provide for a system for adjusting a position of a bed along two axes for a medical imaging device, comprising a single motor, a transmission configured to transmit power from the single motor to a first ball screw via a first clutch, a second clutch configured to transmit power from the first ball screw to a second ball screw, a brake configured to apply a braking force to the second ball screw, a scissors arms configured to be moved by rotation of one or both of the first ball screw and the second ball screw, a bed coupled to top ends of the scissors arms, and a control module configured to control operation of the single motor, the first clutch, the second clutch, and the brake.

The control module may be configured to set the system in a first configuration or in a second configuration. In the first configuration the single motor is configured to move the bed in a horizontal direction and in the second configuration the single motor is configured to move the bed in a vertical direction.

More specifically, in the first configuration the first clutch is configured to engage the transmission to the first ball screw, the second clutch is configured to engage the first ball screw to the second ball screw, and the brake is configured to not apply a brake force to the second ball screw.

And in the second configuration the first clutch is configured to engage the transmission to the first ball screw, the second clutch is configured to not engage the first ball screw to the second ball screw, and the brake is configured to apply a brake force to the second ball screw.

The first clutch is a normally disengaged clutch, the second clutch is a normally engaged clutch, and the brake is a normally open brake that does not apply brake force to the second ball screw in the open state.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" and/or "configured" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for facilitating interaction by an ultrasound operator with an artificial intelligence segmentation module configured to identify and track biological and/or artificial structures in ultrasound images.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

Various embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What are claimed:

1. A system, comprising:
    a drive system comprising:
        a single motor;
        a transmission configured to transmit power from the single motor to a first ball screw via a first clutch; and
        a second clutch configured to transmit power from the first ball screw to a second ball screw;
    a brake configured to apply a braking force to at least a portion of the drive system; and
    a control module configured to control operation of one or more of the single motor, the first clutch, the second clutch, and the brake, wherein the control module is configured to move a scissors arms in a horizontal direction in a first configuration and adjust a vertical height of the scissors arms in a second configuration.

2. The system of claim 1, wherein the first clutch is a normally open clutch and the second clutch is a normally closed clutch.

3. The system of claim 1, wherein the at least a portion of the drive system is the second ball screw.

4. The system of claim 1, wherein, in the first configuration:
    the first clutch is configured to engage the transmission to the first ball screw,
    the second clutch is configured to engage the first ball screw to the second ball screw, and
    the brake is configured to not apply a brake force to the at least a portion of the transmission.

5. The system of claim 1, wherein, in the second configuration:
    the first clutch is configured to engage the transmission to the first ball screw,
    the second clutch is configured to disengage the first ball screw to the second ball screw, and
    the brake is configured to apply a brake force to the at least a portion of the transmission.

6. The system of claim 1, wherein the brake is an electromagnetic brake.

7. The system of claim 1, comprising a sensor configured to provide feedback information regarding a position of a portion of the scissors arms.

8. The system of claim 1, wherein the scissors arms comprise a first and a second top ends and a first and a second bottom ends.

9. The system of claim 8, wherein the first bottom end is rotatably coupled to a first linear bearing and the second bottom end is rotatably coupled to a second linear bearing.

10. The system of claim 9, wherein the first and second linear bearings are coupled to a linear rail.

11. A system for adjusting a position of a bed along two axes for a medical imaging device, comprising:
    a single motor;
    a transmission configured to transmit power from the single motor to a first ball screw via a first clutch;
    a second clutch configured to transmit power from the first ball screw to a second ball screw;
    a brake configured to apply a braking force to the second ball screw;
    a scissors arms configured to be moved by rotation of one or both of the first ball screw and the second ball screw;
    a bed coupled to top ends of the scissors arms; and
    a control module configured to control operation of the single motor, the first clutch, the second clutch, and the brake.

12. The system of claim 11, wherein:
    the first clutch is a normally disengaged clutch,
    the second clutch is a normally engaged clutch, and
    the brake is a normally open brake that does not apply brake force to the second ball screw in the open state.

13. The system of claim 11, wherein the control module is configured to set the system in a first configuration or in a second configuration, wherein in the first configuration the single motor is configured to move the bed in a horizontal direction and in the second configuration the single motor is configured to move the bed in a vertical direction.

14. The system of claim 13, wherein, in the first configuration:
    the first clutch is configured to engage the transmission to the first ball screw,
    the second clutch is configured to engage the first ball screw to the second ball screw, and
    the brake is configured to not apply a brake force to the second ball screw.

15. The system of claim 13, wherein, in the second configuration:
    the first clutch is configured to engage the transmission to the first ball screw,
    the second clutch is configured to not engage the first ball screw to the second ball screw, and
    the brake is configured to apply a brake force to the second ball screw.

* * * * *